United States Patent [19]

Fukui

[11] Patent Number: 4,579,015
[45] Date of Patent: Apr. 1, 1986

[54] SPEED CHANGING APPARATUS FOR A WORKING VEHICLE

[75] Inventor: Tetsu Fukui, Sakai, Japan

[73] Assignee: Kubota, Ltd., Japan

[21] Appl. No.: 742,378

[22] Filed: Jun. 10, 1985

Related U.S. Application Data

[63] Continuation of Ser. No. 401,710, Jul. 26, 1982, abandoned.

[30] Foreign Application Priority Data

Jul. 29, 1981 [JP] Japan ................. 56-119552
Apr. 1, 1982 [JP] Japan ................. 57-55041

[51] Int. Cl.[4] .............................. F16H 3/08
[52] U.S. Cl. ........................... 74/329; 74/331; 74/335; 74/357; 74/360
[58] Field of Search ............... 74/325, 329, 331, 335, 74/357, 358, 359, 360, 339, 355, 745

[56] References Cited

U.S. PATENT DOCUMENTS

| 2,966,067 | 12/1960 | Sommer | 74/355 X |
| 3,105,395 | 10/1963 | Perkins | 74/331 X |
| 3,802,293 | 4/1974 | Winckler et al. | 74/745 |
| 4,106,358 | 8/1978 | Morrison | 74/331 |
| 4,269,077 | 5/1981 | Vandervoort | 74/331 |
| 4,294,130 | 10/1981 | Kisaka et al. | 74/15.4 |
| 4,388,838 | 6/1983 | Richards et al. | 74/331 |
| 4,388,843 | 6/1983 | Teeter | 74/745 |
| 4,409,857 | 10/1983 | Lasoen | 74/360 X |
| 4,428,247 | 1/1984 | Young | 74/331 |
| 4,481,836 | 11/1984 | Richards | 74/331 |

FOREIGN PATENT DOCUMENTS

| 476001 | 4/1929 | Fed. Rep. of Germany | 74/331 |
| 2758506 | 10/1978 | Fed. Rep. of Germany | 74/360 |
| 557807 | 2/1957 | Italy | 74/745 |

Primary Examiner—Leslie A. Braun
Assistant Examiner—Dwight G. Diehl
Attorney, Agent, or Firm—Cushman, Darby & Cushman

[57] ABSTRACT

The invention provides a speed changing apparatus for a working vehicle comprising branched transmission lines between an input shaft and an output shaft. Each of the transmission lines includes one or more synchromesh type change speed gear mechanisms and one hydraulically operated clutch.

3 Claims, 16 Drawing Figures

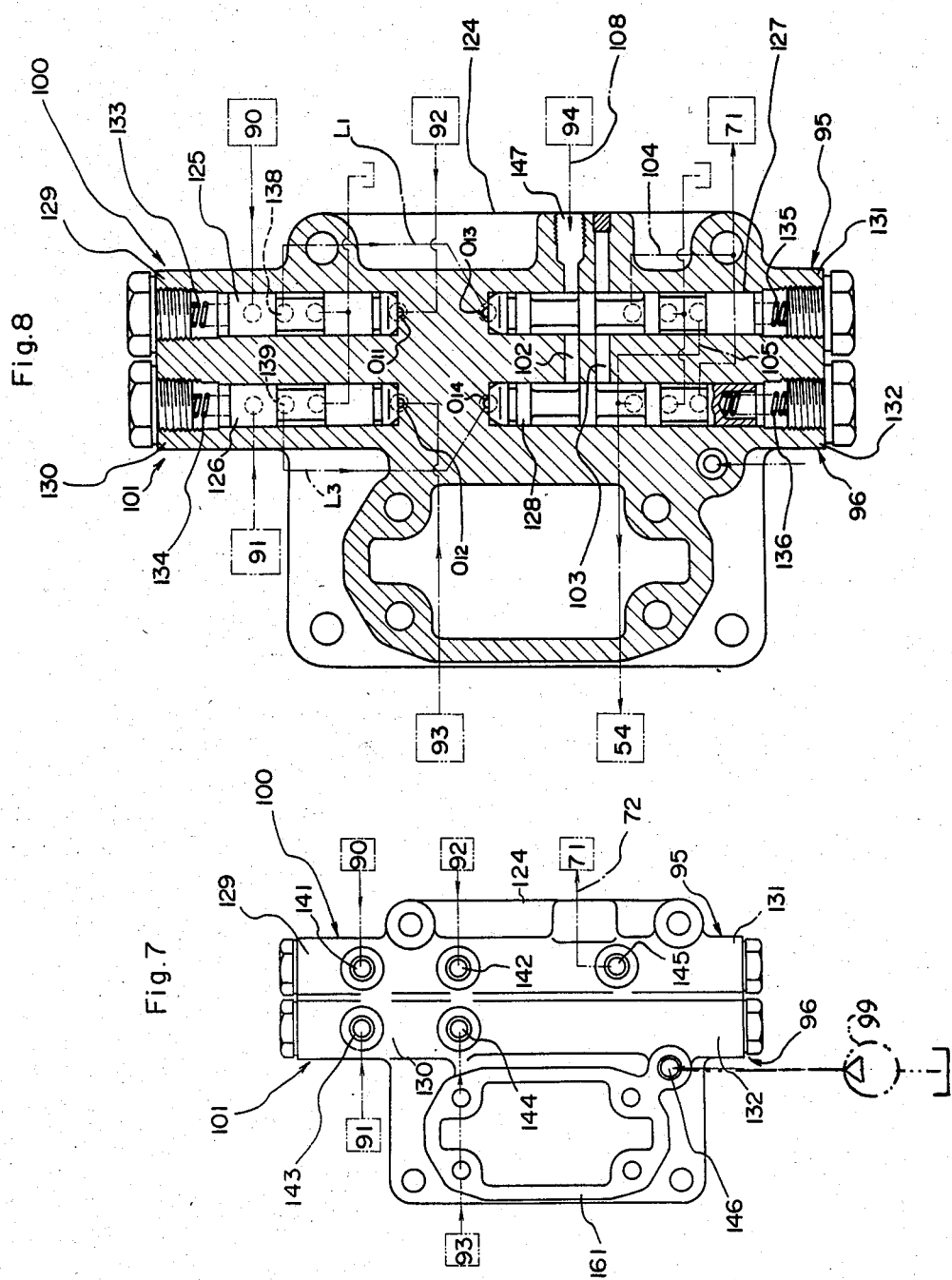

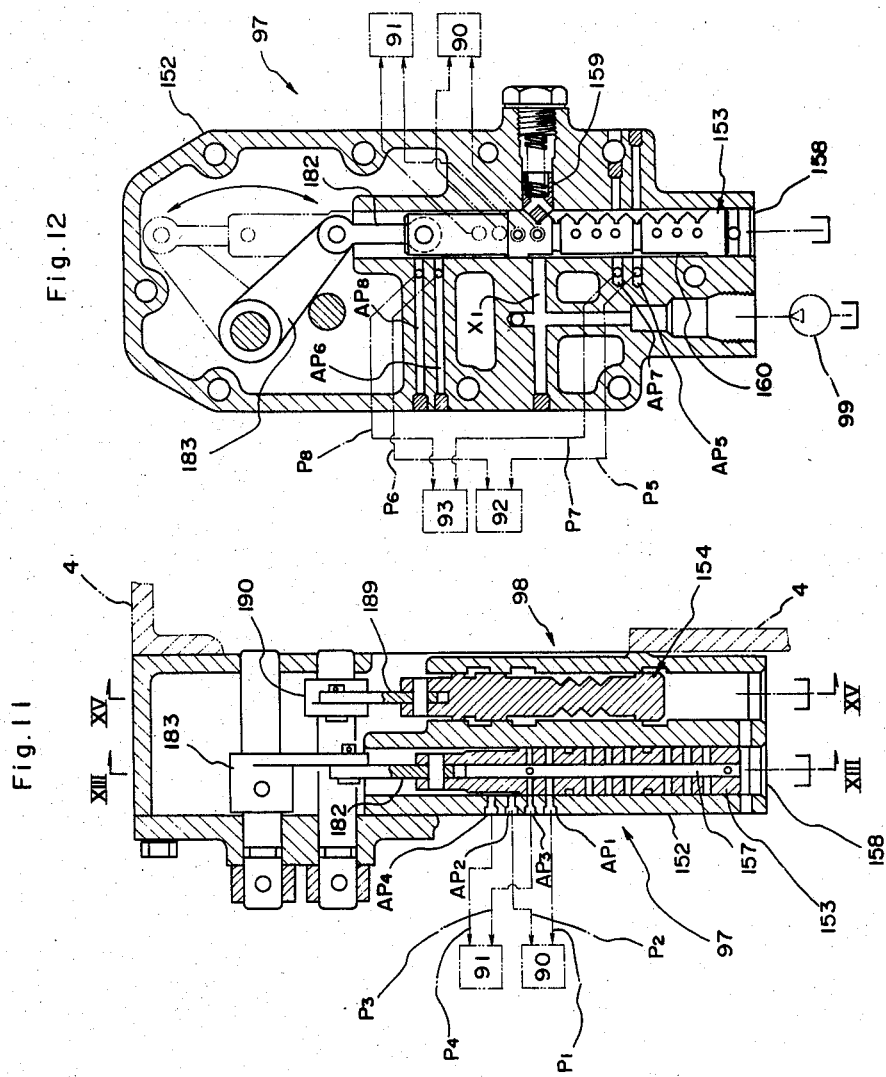

SPEED CHANGING APPARATUS FOR A WORKING VEHICLE

This is a continuation of application Ser. No. 401,710, filed July 26, 1982, now abandoned.

BACKGROUND OF THE INVENTION

1. Field of the Invention

The present invention relates to a speed changing apparatus for a working vehicle, and more particularly to a speed changing apparatus for a working vehicle in which each speed changing operation is carried out without operating a main clutch.

2. Description of the Prior Art

A known speed changing apparatus for a working vehicle has hydraulically operated frictional clutches between respective adjacent pairs of transmission shafts carrying constantly meshing change speed gears, and the speed changing operation involves successive operation of these clutches in and out counter to one another. This prior art apparatus has a disadvantage of a large overall construction where an increased number of the hydraulically operated frictional clutches is required to provide many speeds.

SUMMARY OF THE INVENTION

Having regard to the above noted disadvantage of the prior art, the object of the present invention is to provide a speed changing apparatus for a working vehicle made compact by reducing the number of hydraulically operated frictional clutches and yet capable of speed changing without operating a main clutch.

The speed changing apparatus for a working vehicle according to the invention comprises an input shaft operatively connected to an engine, an output shaft operatively connected to a traveling means, a pair of branched transmission lines, a first cynchromesh type plural step change speed gear mechanism provided on one of the branched transmission lines, a first hydraulically operated frictional clutch provided on the one of the branched transmission lines and between the first change speed gear mechanism and the output shaft, a second synchromesh type plural step change speed gear mechanism provided on the other branched transmission line, and a second hydraulically operated frictional clutch provided on the other branched transmission line and between the second change speed gear mechanism and the output shaft.

More particularly, the branched transmission lines respectively comprise the synchromesh type change speed gear mechanisms to operatively connect and disconnect transmission shafts and change speed gears, and the hydraulically operated frictional clutches operable to select one of the branched transmission lines to operatively connect the input shaft and the output shaft. By operating these clutches speed changing is smoothly carried out without operating a main clutch. The overall construction is made compact due to a small number of hydraulically operated frictional clutches compared with the case of providing a frictional clutch for each change speed gearing, and yet multistep speed changeing is effected smoothly and reliably.

Other objects and advantages of the invention will be apparent from the following description.

BRIEF DESCRIPTION OF THE DRAWINGS

FIGS. 7 through 10 show switch valves 100, 101 and a sixth and a seventh valves 95, 96, FIG. 7 being a plan view, FIG. 8 being a cross sectional view, FIG. 9 being a bottom view of a valve casing, and FIG. 10 being a plan view of a bottom plate of the valve casing, FIGS. 11 through 15 show control valves 97, 98, FIG. 11 being a side view in vertical section, FIG. 12 being a section taken on line XIII—XIII in FIG. 11, FIG. 13 being a front view of a shift valve 153, FIG. 14 being a section taken on line XV—XV in FIG. 11, and FIG. 15 being a front view of a speed select valve 154.

DESCRIPTION OF THE PREFERRED EMBODIMENTS

Figure 1:
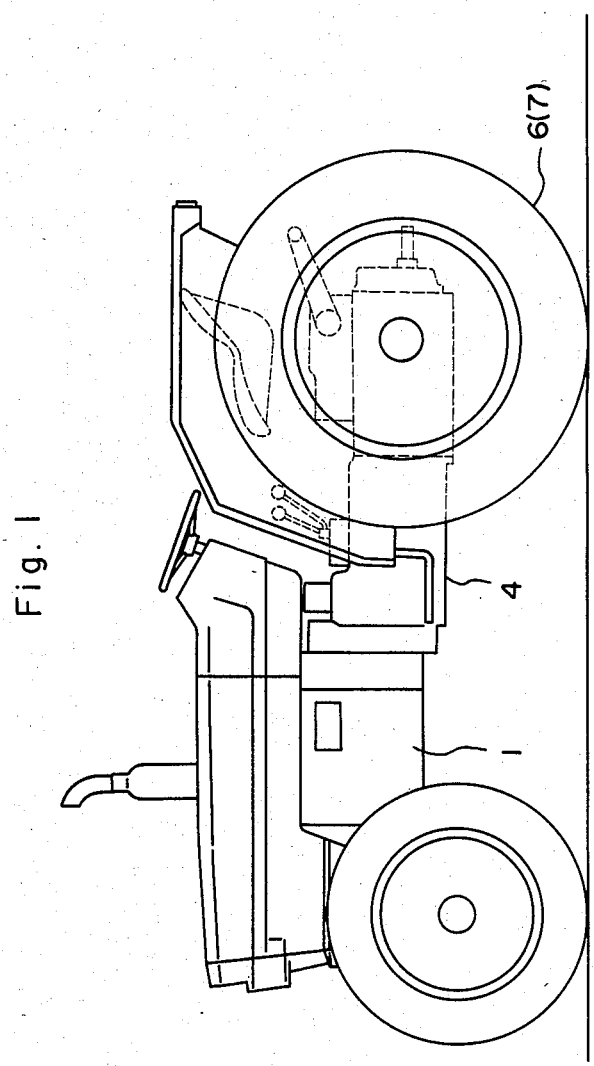
FIG. 1 is a side elevation of a tractor.
Figure 2:
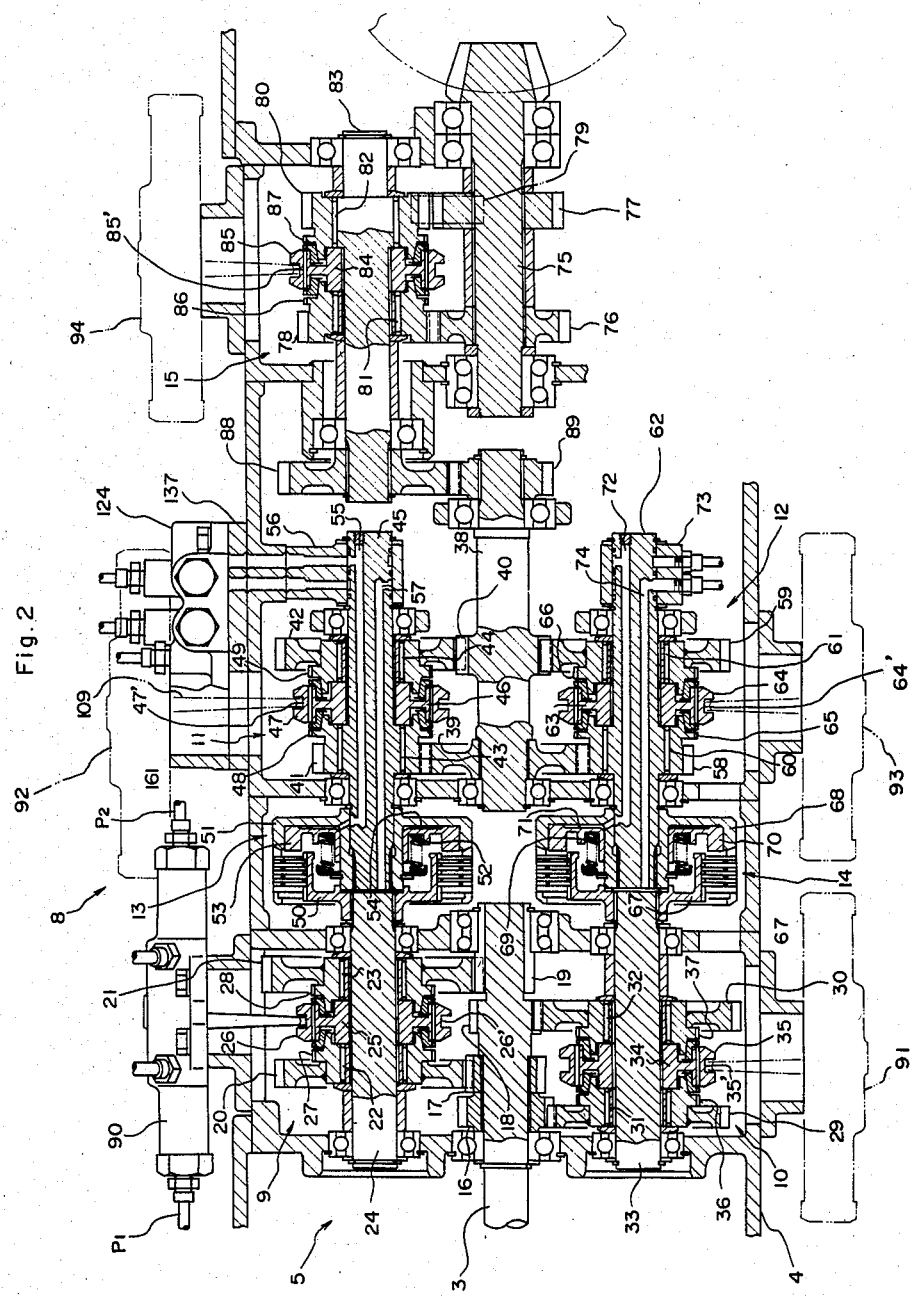
FIG. 2 is a side view in vertical section showing a change speed gearing system 5.
Figure 3:
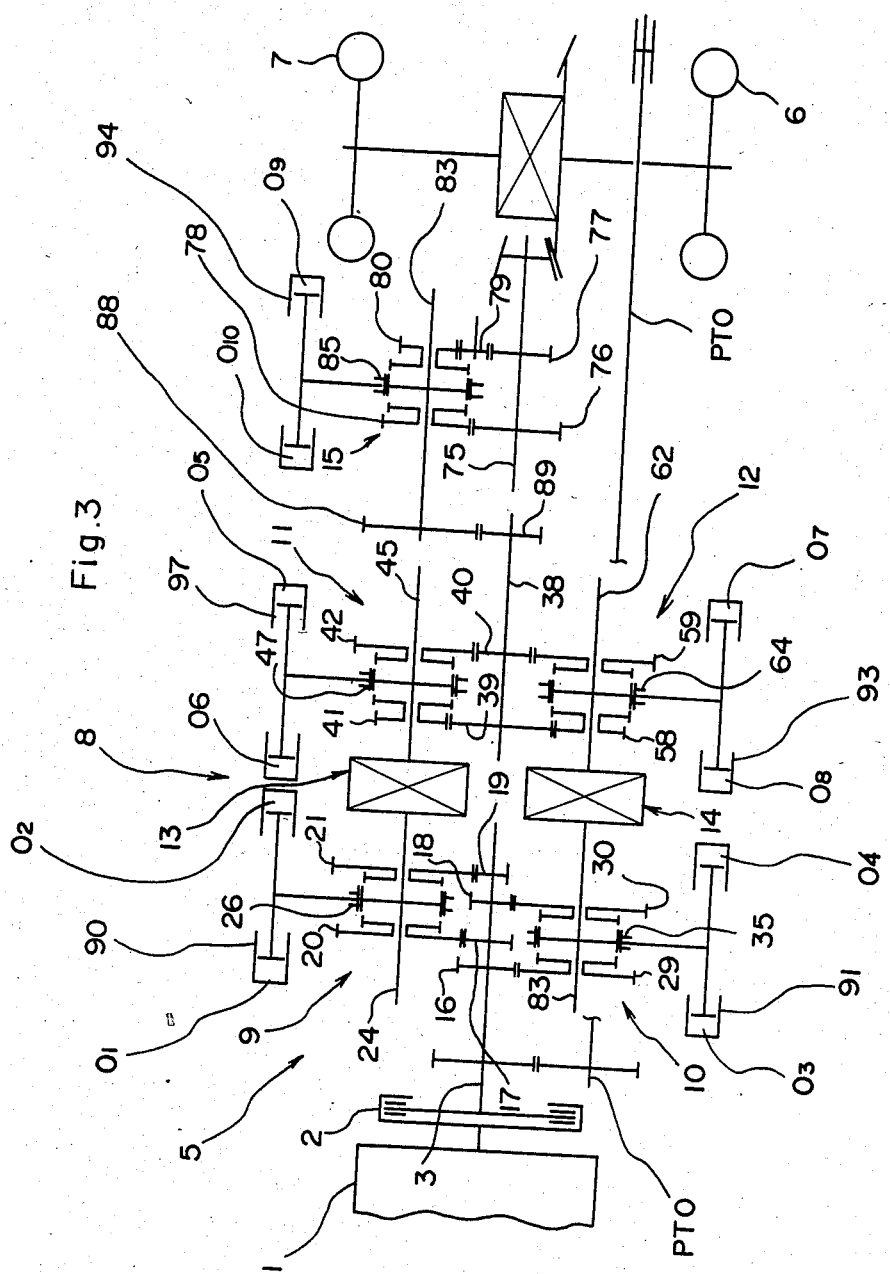
FIG. 3 is a schematic drawing showing a power transmission system including the change speed gearing system 5.

The invention is described, by way of example, as embodied with a tractor shown in FIG. 1. Referring to FIGS. 1-3, the tractor comprises an engine 1 whose drive is transmitted through a main clutch 2 to an input shaft 3 and to a change speed gearing system 5 housed in a transmission case 4. The change speed gearing system 5 changes the drive into eight forward speeds and eight backward speeds which are transmitted to drive wheels 6 and 7. The change speed gearing system 5 is operated by a hydraulic control system 8, which are particularly described hereinafter.

Referring to FIGS. 2 and 3, the change speed gearing system 5 comprises a first change speed gear mechanism 9, a second change speed gear mechanism 10, a third change speed gear mechanism 11, a fourth change speed gear mechanism 12, a first hydraulically operated clutch 13, a second hydraulically operated clutch 14, and a fifth change speed gear mechanism 15 to effect backward forward drive switching, all of the mentioned change speed gear mechanisms being the synchromesh type.

The input shaft 3 carries a first and a second gears 16 and 17 splined thereto and a third and a fourth gears 18 and 19 formed integral therewith. The first to fourth gears 16-19 have diameters diminishing in the stated order, that is to say the first gear 16 has the largest diameter and the fourth gear 19 has the smallest diameter.

The first change speed gear mechanism 9 is driven selectively by the second and the fourth gears 17 and 19, and includes a fifth gear 20 in mesh with the second gear 17, and a sixth gear 21 in mesh with the fourth gear 19, both gears 20 and 21 being mounted on a first intermediate transmission shaft 24 through bearings 22 and 23. A first annular element 25 is fixed to the periphery of the first intermediate transmission shaft 24 and between the fifth and sixth gears 20 and 21, and a first ring 26 is splined to the outer periphery of the first annular element 25 to be axially slidable. The fifth and sixth gears 20 and 21 have a first and a second spline portions 27 and 28 defined on respective sides thereof opposed to each other to mesh with the first ring 26. The first ring 26 is caused by the control system 8 to slide back and forth in the axial directions, and assumes a first speed position when in mesh with the first annular element 25 and the second spline portion 28 at the same time, a third speed position when in mesh with the first annular element 25 and the first spline portion 27 at the same time, and neutral position when in mesh with the first annular element 25 only. During the sliding movement of the first ring 26 the first annular element 25 and the first spline portion 27 or the second spline portion 28 are brought into synchronous rotation by a known synchronizer means. The same synchronization takes place with the second to fifth change speed gear mechanisms 10, 11, 12 and 15 described later.

The second change speed gear mechanism 10 is driven selectively by the first and the third gears 16 and 18, and includes a seventh gear 29 in mesh with the first gear 16 and an eighth gear 30 in mesh with the third gear 18, both gears 29 and 30 being mounted on a second intermediate transmission shaft 33 through bearings 31 and 32. A second annular element 34 is fixed to the periphery of the second intermediate transmission shaft 33 and between the seventh and eighth gears 29 and 30, and a second ring 35 is splined to the outer periphery of the second annular element 34 to be axially slidable. The seventh and eighth gears 29 and 30 have a third and a fourth spline portions 36 and 37 defined on respectove sides thereof opposed to each other to mesh with the second ring 35. The second ring 35 is caused by the control system 8 to slide back and forth in the axial directions, and assumes a second speed position when in mesh with the second annular element 34 and the fourth spline portion 37 at the same time, a fourth speed position when in mesh with the second annular element 34 and the third spline portion 36 at the same time, and neutral position when in mesh with the second annular element 34 only.

The third change speed gear mechanism 11 effects speed changeing at a position of the transmission line between the first intermediate transmission shaft 24 and fifth intermediate transmission shaft 38, the latter shaft 38 carrying a ninth gear 39 having a large diameter and a tenth gear 40 having a small diameter, both securely mounted thereto. The third change speed gear mechanism 11 includes an eleventh gear 41 in mesh with the ninth gear 39 and a twelfth gear 42 in mesh with the tenth gear 40, both gears 41 and 42 being mounted on a third intermediate transmission shaft 45 through bearings 43 and 44. A third annular element 46 is fixed to the periphery of the third intermediate transmission shaft 45 and between the eleventh and twelfth gears 41 and 42, and a third ring 47 is splined to the outer periphery of the third annular element 46 to be axially slidable. The eleventh and twelfth gears 41 and 42 have a fifth and a sixth spline portions 48 and 49 defined on respective sides thereof opposed to each other to mesh with the third ring 47. The third ring 47 is caused by the control system 8 to slide back and forth in the axial directions, and assumes a first or third speed position when in mesh with the third annular element 46 and the fifth spline portion 48 at the same time, a fifth or seventh speed position when in mesh with the third annular element 46 and the sixth spline portion 49 at the same time, the neutral position when in mesh with the third annular element 46 only.

The first hydraulically operated frictional clutch 13 functions to make and break operative connection between the first and the third intermediate transmission shafts 24 and 45. The first clutch 13 comprises an inner casing 50 secured to the first intermediate transmission shaft 24 and supporting friction plates, and an outer casing 51 secured to the third intermediate transmission shaft 45 and supporting the friction plates. The outer casing 51 houses a hydraulic piston 53 urged by a spring 52 to be freely retractable. A first oil chamber 54 is defined between the piston 53 and the outer casing 51. The first clutch 13 is operated by oil delivered into and withdrawn from the oil chamber 54 through a first oil passage 55 defined in the third intermediate transmission shaft 45. Reference 56 indicates a rotary joint attached relatively rotatably to a rear end of the third intermediate transmission shaft 45 for coupling to hydraulic piping. Reference 57 indicates a second oil passage for receiving lubricating oil from the rotary joint 56 and delivering, the lubricating oil to the clutch 13. The oil is delivered to and withdrawn from the first oil chamber 54 by the control system 8.

The fourth change speed gear mechanism 12 effects speed changing at a position of the transmission line between the second intermediate transmission shaft 33 and the fifth intermediate transmission shaft 38, and includes a thirteenth gear 58 in mesh with the ninth gear 39 and a fourteenth gear 59 in mesh with the tenth gear 40, both gears 58 and 59 being mounted in a fourth intermediate transmission shaft 62 through bearings 60 and 61. A fourth annular element 63 is fixed to the periphery of the fourth intermediate transmission shaft 62 and between the thirteenth and fourteenth gears 58 and 59, and a fourth ring 64 is splined to the outer periphery of the fourth annular element 63 to be axially slidable. The thirteenth and fourteenth gears 58 and 59 have a seventh and an eighth spline portions 65 and 66 defined on respective sides thereof opposed to each other to mesh with the fourth ring 64. The fourth ring 64 is caused by the control system 8 to slide back and forth in the axial directions, and assumes a second or fourth speed position when in mesh with the fourth annular element 63 and the seventh spline portion 65 at the same time, a sixth or eighth speed position when in mesh with the fourth annular element 63 and the eighth spline portion 66 at the same time, and neutral position when in mesh with the fourth annular element 63 only.

The second hydraulically operated frictional clutch 14 functions to make and break operative connection between the second and fourth intermediate transmission shafts 33 and 62. The second clutch 14 comprises an inner casing 67 secured to the second intermediate transmission shaft 33 and supporting friction plates, and an outer casing 68 secured to the fourth intermediate transmission shaft 62 and supporting brake discs. The outer casing 68 houses a hydraulic piston 70 urged by a spring 69 to be freely retractable. A second oil chamber 71 is defined between the piston 70 and the outer casing 68. The second clutch 14 is operated by oil delivered into and withdrawn from the oil chamber 71 through a third oil passage 72 defined in the fourth intermediate transmission shaft 62. Reference 73 indicates a rotary joint attached relatively rotatably to a rear end of the fourth intermediate transmission shaft 62 for coupling to hydraulic piping. Reference 74 indicates a fourth oil passage for receiving lubricating oil from the rotary joint 73 and delivering the lubricating oil to the clutch 14. The oil is delivered to and withdrawn from the second oil chamber 71 by the control system 8.

The fifth change speed gear mechanism 15 effects backward forward switching of shaft rotation at a position of the transmission line between the fifth intermediate transmission shaft 38 and the output shaft 75, the latter shaft 75 carrying a fifteenth and a sixteenth gears 76 and 77. The fifth change speed gear mechanism 15 includes a seventeenth gear 78 in direct mesh with the fifteenth gear 76 and an eighteenth gear 80 in indirect mesh with the sixteenth gear 77 through an idler gear 79, both gears 78 and 80 being mounted on a sixth intermediate transmission shaft 83 through bearings 81 and 82. A fifth annular element 84 is fixed to the periphery of the sixth intermediate transmission shaft 83 and between the seventeenth and eighteenth gears 78 and 80, and a fifth ring 85 is splined to the outer periphery of the fifth annular element 84 to be axially slidable. The seventeenth and eighteenth gears 78 and 80 have a ninth and tenth spline portions 86 and 87 defined on respective sides thereof opposed to each other to mesh with the fifth ring 85. The fifth ring 85 is caused by the control system 8 to slide back and forth in the axial directions, and assumes a forward speed position when in mesh with the sixth annular element 84 and the ninth spline portion 86 at the same time, a backward speed position when in mesh with the fifth annular element 84 and the tenth spline portion 87 at the same time, and neutral position when in mesh with the fifth annular element 84 only. The fifth and sixth intermediate transmission shafts 38 and 83 are operatively connected to each other through a nineteenth and a twentieth gears 88 and 89 fixed thereto, respectively.

As shown in FIG. 3, a power takeoff shaft PTO is operatively connected to the input shaft 3 through gears.

The control system 8 hydraulically controls the first to fifth rings 26, 35, 47, 67 and 85 and the two frictional clutches 13 and 14 to provide eight forward speeds and eight backward speeds.

Figure 4:
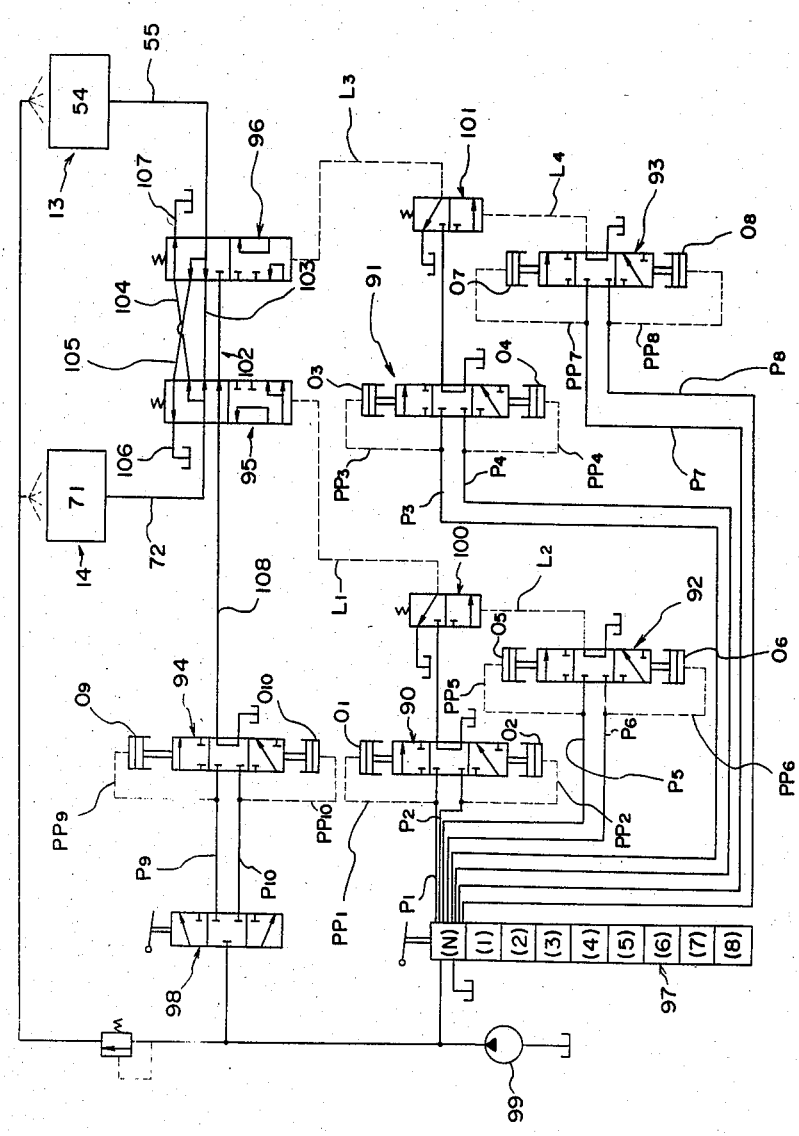
FIG. 4 is a schematic drawing of a hydraulic circuitry for a control system 8.

A hydraulic circuitry of the control system 8 is now described with reference to FIG. 4. The circuitry includes a first valve 90 which acts also as actuator for controlling the first ring 26, a second valve 91 which acts also as actuator for controlling the second ring 35, a third valve 92 which acts also as actuator for controlling the third ring 47, a fourth valve 93 which acts also as actuator for controlling the fourth ring 64, a fifth valve 94 which acts also as actuator for controlling the fifth ring 85, a sixth valve 95 for supplying oil to and withdrawing it from the first oil chamber 54, and a seventh valve 96 for supplying oil to and withdrawing it from the second oil chamber 71. The first to seventh valves 90-96 are connected between a speed control valve 97 and a backward forward switch valve 98 as follows.

The first to fourth valves 90-93 are respectively connected to the speed control valve 97 through two input pipes $P_1$-$P_8$. The speed control valve 97 is adapted to assume nine control positions to selectively pass oil received from a pump 99 to the pipes $P_1$-$P_8$ to provide eight step speed changing, which is listed in Table I.

TABLE I

| Control Positions | Speeds | Pipes Used |
|---|---|---|
| Neutral | Standstill | $P_5$, $P_7$ |
| 1st | 1st | $P_1$, $P_5$, $P_7$ |

TABLE I-continued

| Control Positions | Speeds | Pipes Used |
|---|---|---|
| 2nd | 2nd | $P_3$, $P_7$, $P_5$ |
| 3rd | 3rd | $P_2$, $P_5$, $P_7$ |
| 4th | 4th | $P_4$, $P_7$ |
| 5th | 5th | $P_1$, $P_6$ |
| 6th | 6th | $P_3$, $P_8$, $P_6$ |
| 7th | 7th | $P_2$, $P_6$, $P_8$ |
| 8th | 8th | $P_4$, $P_8$, $P_6$ |

The first to fourth valves 90-93 respectively have two oil chambers $O_1$-$O_8$ which receive oil via pilot pipes $PP_1$-$PP_8$ branched from the input pipes $P_1$-$P_8$ thereby to switch spools of the respective valves 90-93. The oil entering the first valve 90 via the input pipe $P_1$ or $P_2$ proceeds to a first switch valve 100 through ports $P'_1$, $P'_2$ owing to an open position assumed by the first valve 90 as the oil is supplied to either one of the oil chambers $O_1$, $O_2$. The oil entering the third valve 92 via the input pipe $P_5$ or $P_6$ proceeds to an opening pilot line $L_2$ leading to the first switch valve 100 through ports $P'_5$, $P'_6$ owing to an open position assumed by the third valve 92 as the oil is supplied to either one of the oil chambers $O_5$, $O_6$. Thus, when oil is supplied through one of the pipes $P_1$ and $P_2$ and one of the pipes $P_5$ and $P_6$ at the same time, the oil delivered by the pipe $P_1$ or $P_2$ proceeds through the first switch valve 100 and enters an opening pilot line $L_1$ to open the sixth valve 95.

According to the above hydraulic piping arrangement, the first frictional clutch 13 is automatically brought into an "in" position when providing the first, third, fifth and seventh speeds.

The oil entering the second valve 91 via the input pipe $P_3$ or $P_4$ proceeds to a second switch valve 101 through ports $P'_3$, $P'_4$ owing to an open position assumed by the second valve 91 as the oil is supplied to either one of the oil chambers $O_3$, $O_4$. The oil entering the fourth valve 93 via the input pipe $P_7$ or $P_8$ proceeds to an opening pilot line $L_4$ leading to the second switch valve 101 through ports $P'_7$, $P'_8$ owing to an open position assumed by the fourth valve 93 as the oil is supplied to either one of the oil chambers $O_7$, $O_8$. Thus, when oil is supplied through one of the pipes $P_3$ and $P_4$ and one of the pipes $P_7$ and $P_8$ at the same time, the oil delivered by the pipe $P_3$ or $P_4$ proceeds through the second switch valve 101 and enters an opening pilot line $L_3$ to open the seventh valve 96.

According to the above hydraulic piping arrangement, the second frictional clutch 14 is automatically brought into an "in" position when providing the second, fourth, sixth and eighth speeds.

The backward forward switch valve 98 is adapted to selectively switch oil flows between an oil flow through a pipe $P_9$ and a pilot pipe $PP_9$ and an oil flow through a pipe $P_{10}$ and a pilot pipe $PP_{10}$ to deliver the oil to an oil chamber $O_{10}$ of the fifth valve 94. A spool of the fifth valve 94 is thereby shifted between three positions to bring the fifth ring 85 to forward, backward and neutral positions.

The oil entering the fifth valve 94 from the pipe $P_9$ or $P_{10}$ flows through ports $P'_9$, $P'_{10}$ to a hydraulic circuit controlled by the sixth and seventh valves 95 and 96, and then to either the first oil chamber 54 of the first frictional clutch 13 or the second oil chamber 71 of the second frictional clutch 14.

The sixth and 7th valves 95 and 96 are in communication with each other through a first to a fourth communicating lines 102-105, and are adapted to control intercommunication among an oil passage 108 leading from the fifth valve 94, the first and second oil chambers 54 and 71, and a first and second drain ports 106 and 107, as shown in Table II (in which the relevant constituent members are represented by their reference numbers only).

TABLE II

| Valve Positions | Communications | Clutch Positions |
|---|---|---|
| 95 and 96 are closed. | 108 → 95 → 102 → 96<br>54 → 55 → 96 → 105 → 95 → 106<br>71 → 72 → 95 → 104 → 96 → 107 | 13 and 14 are out. |
| 95 is open and 96 is closed. | 108 → 95 → 103 → 96 → 55 → 54<br>71 → 72 → 95 → 106 | 13 is in and 14 is out. |
| 95 is closed and 96 is open | 108 → 95 → 102 → 96 → 103 → 95 → 72 → 71<br>54 → 55 → 96 → 107 | 13 is out and 14 is in. |
| 95 and 96 are open. | 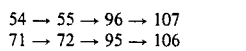<br>54 → 55 → 96 → 107<br>71 → 72 → 95 → 106 | 13 and 14 are out. |

Thus, when the sixth and seventh valves 95 and 96 assume the open position at the same time for some reason, both of the first and second frictional clutches 13 and 14 come to the "out" position, thereby to avoid simultaneous drive of the fifth intermediate transmission shaft 38 by the third and fourth intermediate transmission shafts 45 and 62.

Figure 6:
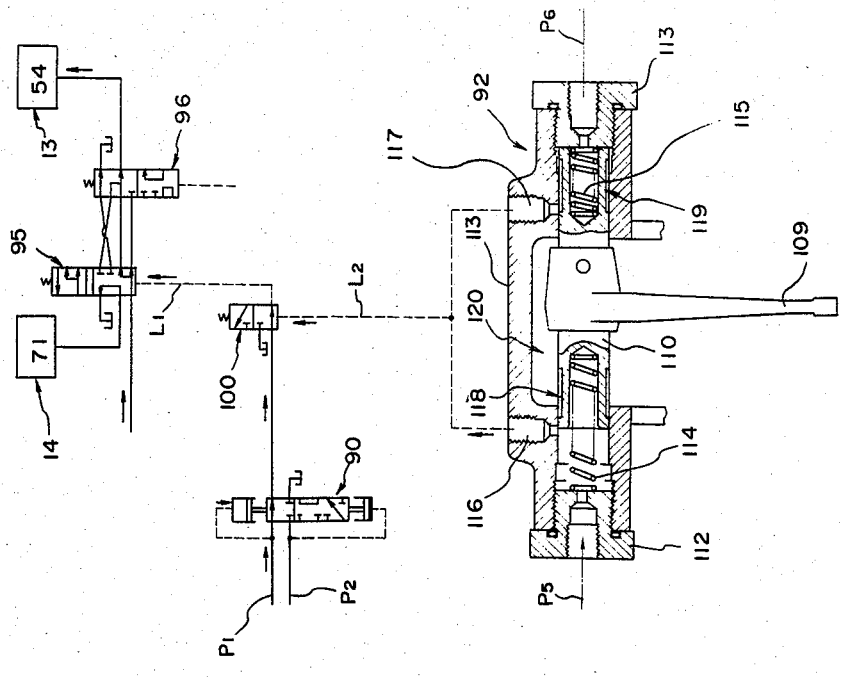
FIGS. 5 and 6 show a vertical section of a third valve 92 and part of the hydraulic circuitry relating to the third valve 92, FIG. 5 showing the valve in neutral position, and FIG. 6 showing the valve in a position to provide a first speed.
Figure 5:
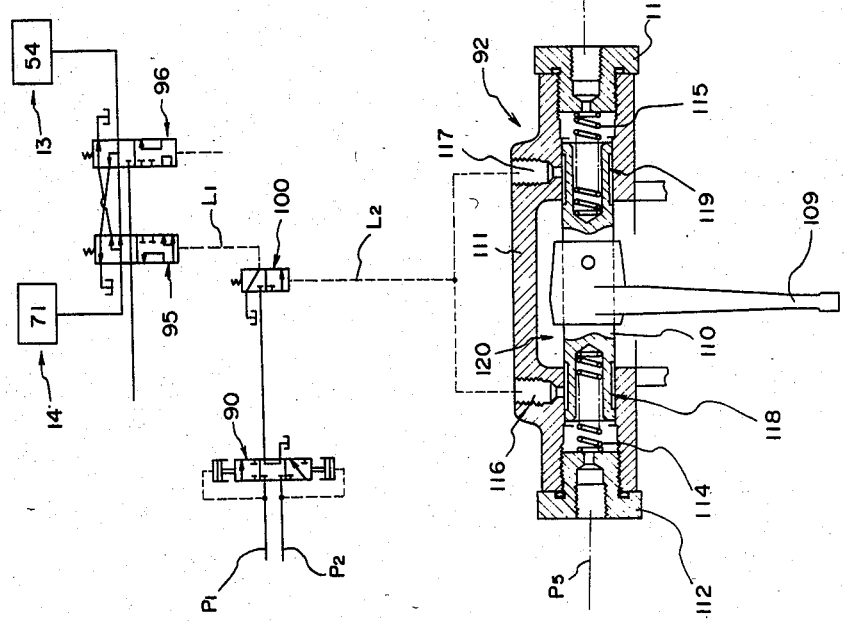

The first to fifth valves 90-94 have a like construction, and the specific construction of the third valve 92 is described hereinafter as representative of the five, with reference to FIGS. 5 and 6.

The third valve 92 includes a spool 110 carrying a base end of a fork 109 pinned to its mid-position. An extreme end of the fork 109 is engaged with an annular groove 47' defined in the outer periphery of the third ring 47. The spool 110 is slidably supported at both ends thereof by a bracket 111 mounted on an upper surface of the transmission case 4. Plugs 112 and 113 are screwed into front and rear ends of the bracket 111 for coupling with the pipes $P_5$ and $P_6$, respectively. Inner end faces of the plugs 112 and 113 act as stoppers to determine the stroke ends of the spool 110. Coil springs 114 and 115 are mounted between the inner end faces of the plugs 112 and 113 and the ends of the spool, respectively, to maintain the spool 110 in neutral position, hence to maintain the third change speed gear 11 in neutral position, when oil is not supplied through the pipe $P_5$ or $P_6$. The bracket 111 includes a pair of ports 116 and 117 connected to the pilot oil line $L_2$ leading to the first switch valve 100, and the spool 110 includes annular grooves 118 and 119 defined adjacent the ends thereof and having a relatively large axial width. When pressure oil is not supplied to any one of the pipes $P_1$, $P_2$, $P_5$ and $P_6$ of the first and third valves 90 and 92, the ports 116 and 117 are in communication with a drain spacing 120 (which is in communication with the interior space of the transmission case 4) defined centrally of the bracket 111 through the annular grooves 118 and 119, respectively, as shown in FIG. 5. When, for example, the speed control valve 97 is moved to the first control position (for the first speed) to supply oil to the pipes $P_1$ and $P_5$, the first valve 90 is switched and the spool 110 of the third valve 92 is moved to the righthand end as shown in FIG. 6. In this state one of the ports 116 communicates with the pipe $P_5$ and the other port 117 is shut inside the bracket 111, whereby oil pressure in the pipe $P_5$ is passed to the pilot oil line $L_2$, the resulting pilot pressure opens the first switch valve 100. The oil pressure reaching the first switch valve 100 from the first valve 90 is passed on to the pilot oil line $L_1$ thereby to switch the sixth valve 95 and let in the first frictional clutch 13.

When the speed control valve 97 is operated in order to change from one speed step (the first speed, for example) at which the first frictional clutch 13 is in to a next speed step (the second speed, for example), the oil supply to the pipe $P_5$ is broken and accordingly the spool 110 returns to neutral under the force of the spring 115. As the spool 110 begins to move forming space between its end and the inner end surface of the plug 113, the port 117 communicates with the pipe $P_6$ through the annular groove 119 and the pressure in the pilot oil line $L_2$ begins to lower. As the spool 110 moves on a little, an end (the lefthand end in the drawings) of the annular groove 118 begins to interfere with the port 116 placing the pilot oil line $L_2$ in communication with the drain spacing 120 through the port 116 and the annular groove 118. The first switch valve 100 returns due to the release of pressure in the pilot line $L_2$, whereby the pressure in the pilot line $L_1$ escapes and causes return of the sixth valve 95, placing the first frictional clutch 13 out of operation at once. When providing a different speed such as the fifth or seventh speed by switching the first valve 90 and supplying pressure oil to the pipe $P_6$ of the third valve 92, the first frictional clutch 13 is let in by the pressure applied to the pilot oil line $L_2$ via the other port 117. To switch from this speed step, the pilot pressure is released through the annular grooves 118 and 119 as in the preceding example.

As will be understood from the above description, the provision of the wide annular grooves 118 and 119 for releasing the pilot pressure enables release of the first frictional clutch 13 to be effected quickly by releasing the pilot pressure for the first switch valve 100 simultaneously with the spool movement when the spool 110 returns to neutral from one of the change speed positions. Therefore, even a quick operation of the speed control valve 97 can be followed by the in and out clutch action at high speed.

The first to fifth valves 90-94 are mounted to the transmission case 4 as shown in FIG. 2, and the oil chambers $O_1$-$O_{10}$ are located relative to the first to fifth rings 26, 34, 43, 64 and 85 as shown in FIG. 3.

Reference numbers 26', 34', 43', 64' and 85' in FIG. 2 indicate fork receiving annular grooves defined in the outer peripheries of the respective rings.

Constructions of the first and second switch valves 100 and 101 and the sixth and seventh valves 95 and 96 are described hereinafter with reference to FIGS. 7-10.

A valve casing 124 includes four, a first to a fourth, cylinder portions 129-132 containing spools 125-128, respectively. Pilot oil chambers $O_{11}$-$O_{14}$ are defined at one end of the respective cylinder portions 129-132, and the spools 125-128 are urged by springs 133-136 toward the oil chambers $O_{11}$-$O_{14}$, respectively.

Figure 9:
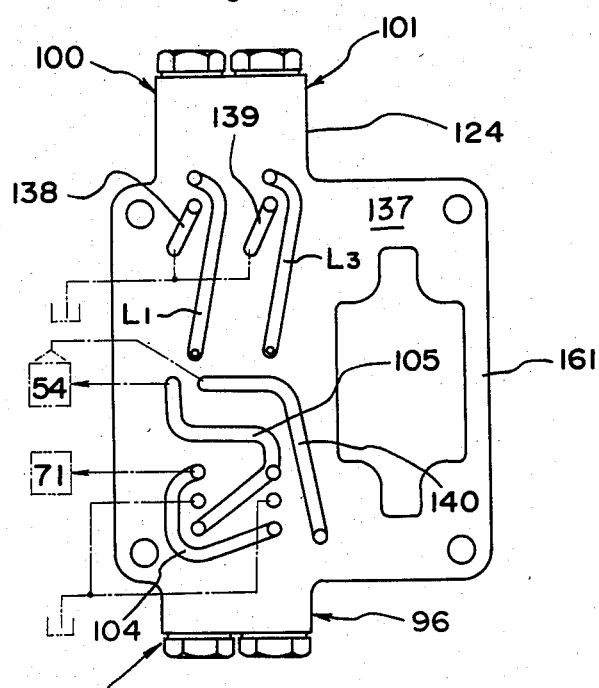

As shown in FIG. 9, the valve casing 124 has a bottom face closed by a bottom plate 137 and having the sixth valve pilot line $L_1$, the seventh valve pilot line $L_3$, the third communicating line 104, the fourth communicating line 105, a first drain oil line 138, a second drain oil line 139, and a lubricating oil line, all these lines being defined in form of grooves on the bottom face.

As shown in FIG. 7, the valve casing 124 includes a first to a sixth joint ports 141-146 on a top face thereof, of which the first joint port 141 is connected to the oil line leading from the first valve 90, the second joint port 142 is connected to the first switch valve pilot line $L_2$, the third joint port 143 is connected to the oil line from the second valve 91, the fourth joint port 144 is connected to the second switch valve pilot oil line $L_4$, the fifth joint port 145 is connected to an oil line leading to the third oil passage 72, and the sixth joint port 146 is connected to a lubricating oil line from the pump 99. A seventh joint port 147 is provided on a lateral side of the valve casing 124 to be connected to the oil passage 108 leading from the fifth valve 94.

Figure 10:
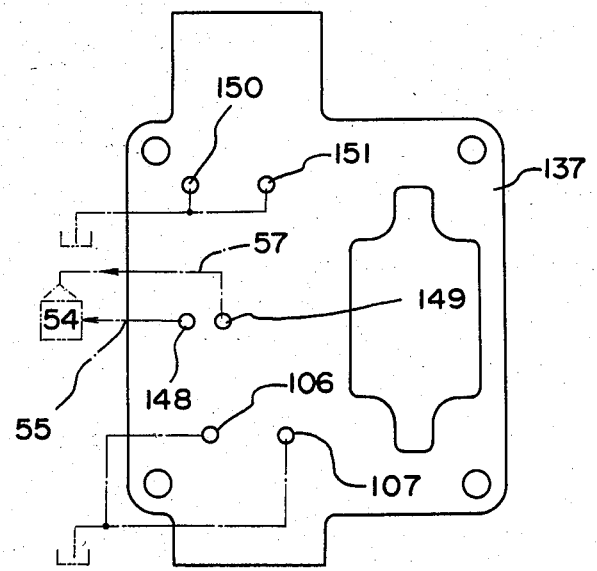

As shown in FIG. 10, the bottom plate 137 includes an eighth joint port 148 for connecting a pipe extending from an end of the fourth communicating line 105 to the first oil passage 55, and a ninth joint port for connecting a pipe extending from the lubricating oil line 140 to the second oil passage 57. The bottom plate 137 also includes the first and second drain ports 106 and 107 and a third and a fourth drain ports 150 and 151.

Referring to FIG. 8, the first cylinder portion 129, which constitutes the first switch valve 100, has the following construction. The oil chamber $O_{11}$ of the first cylinder portion 129 is in communication with the second joint port 142 through which oil flows in and out to actuate the spool 125. The first joint port 141 and the leading end of the sixth valve pilot line $L_1$ are disposed in such positions as to be brought into and out of communication with each other by the movement of the spool 125. The leading end of the first drain oil line 138 leading to the third drain port 150 is disposed in a position to communicate with the leading end of the pilot oil line $L_1$ when the latter is out of communication with the first joint port 141.

The second cylinder portion 130, which constitutes the second switch valve 101, has the following construction. The oil chamber $O_{12}$ of the second cylinder portion 130 is in communication with the fourth joint port 144 through which oil flows in and out to actuate the spool 126. The third joint port 143 and the leading end of the seventh valve pilot line $L_3$ are disposed in such positions as to be brought into and out of communication with each other by the movement of the spool 126. The leading end of the second drain oil line 139 communicating with the fourth drain port 151 is disposed in a position to communicate with the leading end of the pilot oil line $L_3$ when the latter is out of communication with the third joint port 143.

The third cylinder portion 131, which constitutes the sixth valve 95, and the fourth cylinder portion 132, which constitutes the seventh valve 96, are divided into three oiltight parts corresponding to small diameter and large diameter portions of the spools 127 and 128, respectively. The first part of the third cylinder portion 131 is in communication with the seventh joint port 147 and is also in communication with the first part of the fourth cylinder portion 132 through the first communicating line 102. The second parts of the cylinder portions 131 and 132 in closed positions are communicating with each other through the second communicating line 103 which establishes communication between the first parts thereof when the two cylinders portions 131 and 132 are in open positions. The second part of the third cylinder portion 131 is in communication with the leading end of the third communicating line 104, and the third part thereof (or the second part when the spool has moved to an open position) is in communication with the first drain port 106. The third part of the third cylinder portion 131 is also in communication with an end of the fouth communicating line 105. The second part of the fourth cylinder portion 132 is in communication with an intermediate portion of the fourth communicating line 105, and the third part thereof is in communication with a rear end of the third communicating line 104. The second drain port 107 is positioned to communicate with the third part of the fourth cylinder portion 132 when the latter is closed and with the second part thereof when same is open. The oil chamber $O_{13}$ of the third cylinder portion 131 is in communication with a rear end of the sixth valve pilot oil line $L_1$, and the oil chamber $O_{14}$ of the fourth cylinder portion 132 is in communication with a rear end of the seventh valve pilot oil line $L_3$.

Thus, the controls are provided by switching the oil line as shown in Table II.

The valve casing 124 is provided with an annular mounting base 161 to which a bracket for the third valve 92 is attached.

Constructions of the hydraulic control valve 97 and the backward forward switch valve 98 are now particularly described with reference to FIGS. 11-15.

Figure 13:
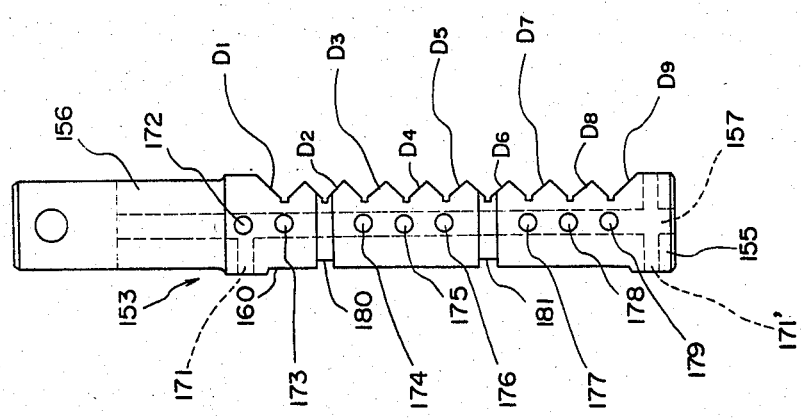

A valve casing 152 includes two cylinder portions having a shaft-like shift valve 153 and a shaft-like speed select valve 154 slidably mounted therein, respectively. As shown in FIG. 13, the shaft valve 153, which constitutes the hydraulic control valve 97, comprises a hollow shaft including a large diameter portion 155 and a small diameter portion 156, whose central bore 157 communicates with a drain port 158 disposed therebelow. The large diameter portion has a first to a ninth detent receiving recesses $D_1$-$D_9$ arranged at equal intervals along one side intermediately between two ends thereof, to be engaged by a detent 159 supported by the valve casing 152. The large diameter portion has a cutout 160 on the other side intermediately between the two ends thereof.

As shown in FIG. 12, the part of the casing 152 opposed to the cutout 160 includes an eighth port $AP_8$ communicating with the eighth pipe $P_8$, a sixth port $AP_6$ communicating with the sixth pipe $P_6$, a first input port $X_1$ communicating with the pump 99, a seventh port $AP_7$ communicating the seventh pipe $P_7$, and a fifth port $AP_5$ communicating with the fifth pipe $P_5$.

As shown in FIG. 11, at an angle of 90 degrees from the above ports there are a fourth port $AP_4$ communicating with the fourth pipe $P_4$, a second port $AP_2$ communicating with the second pipe $P_2$, a third port $AP_3$ communicating with the third pipe $P_3$, and a first port $AP_1$ communicating with the first pipe $P_1$. The upper and lower parts of the large diameter portion 155 opposite the fifth to eighth ports $AP_5$-$AP_8$ include first drain bores 171 and 171', and the parts of the large diameter portion 155 include a second to a ninth drain bores 172-179. Grooves 180 and 181 are provided at positions corresponding to the second and sixth detent receiving recesses $D_2$ and $D_6$ for intercommunicating the detent receiving recess side and the cutout 160.

The above construction is adapted to establish communications of the ports $AP_1$-$AP_8$ with the input port $X_1$ and the drain port 158 as shown in Table III.

TABLE III

| Change Speed Positions | Recess Engaged by Detent | Ports in Communication with Input Port X$_1$ | Ports in Communication with Drain Port 158 |
|---|---|---|---|
| neutral | D$_1$ | AP$_5$,AP$_7$ | AP$_3$,AP$_1$ |
| 1st control position (1st speed) | D$_2$ | AP$_5$,AP$_7$,AP$_1$ | AP$_3$,AP$_2$ |
| 2nd control position (2nd speed) | D$_3$ | AP$_5$,AP$_7$,AP$_3$ | AP$_2$,AP$_4$,AP$_1$ |
| 3rd control position (3rd speed) | D$_4$ | AP$_5$,AP$_7$,AP$_2$ | AP$_4$,AP$_3$,AP$_1$ |
| 4th control position (4th speed) | D$_4$ | AP$_7$,AP$_4$ | AP$_6$,AP$_2$ AP$_3$,AP$_1$,AP$_5$ |
| 5th control position (5th speed) | D$_6$ | AP$_6$,AP$_1$ | AP$_2$,AP$_3$,AP$_4$ AP$_8$,AP$_5$,AP$_7$ |
| 6th control position (6th speed) | D$_7$ | AP$_6$,AP$_8$,AP$_3$ | AP$_5$,AP$_7$,AP$_1$ AP$_2$,AP$_4$ |
| 7th control position (7th speed) | D$_8$ | AP$_6$,AP$_8$,AP$_2$ | AP$_5$,AP$_7$,AP$_1$ AP$_3$,AP$_4$ |
| 8th control position (8th speed) | D$_9$ | AP$_6$,AP$_8$,AP$_4$ | AP$_1$,AP$_3$ AP$_2$,AP$_5$,AP$_7$ |

The shift valve 153 is connected to an operator arm 183 through a link 182 pivoted to the upper end of the valve 153. The valve 153 is shifted, as described, by oscillations of this operator arm 183 outwardly of the valve 153.

Figure 15:
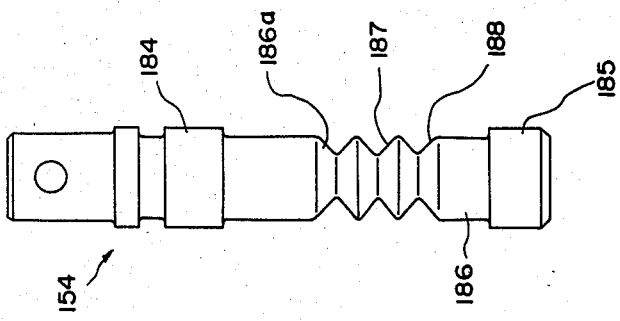
Figure 14:
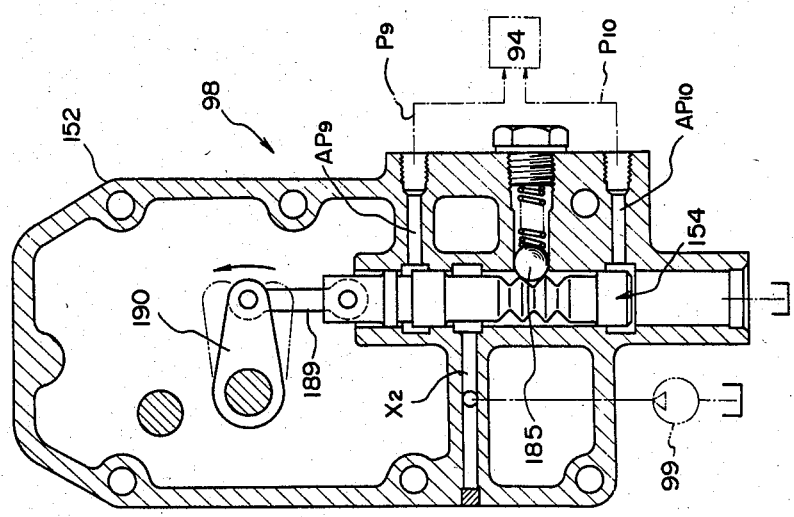

As shown in FIG. 15, the speed select valve 154, which constitutes the backward switch valve 98, comprises large diameter portions 184 and 185 at both ends thereof with a small diameter portion 186 in between. The small diameter portion 186 includes three annular detent receiving recesses 186a–188 of V-shaped section to be engaged by a detent 185 supported by valve casing 152. A ninth port AP$_9$ and a tenth port AP$_{10}$ are disposed in positions opposite the two large diameter portions 184 and 185 when the intermediate recess 187 is engaged by the detent 185, and a second input port X$_2$ is disposed in a position constantly opposed to the small diameter portion 184.

The select valve 154 is connected to a free end of a second operator arm 190 through a link 189 pivoted to the upper end of the valve 154 to be shifted by an operator lever disposed outside, whereby the detent 185 switches right and left from the intermediate recess 187. Therefore, the valve 154 is switchable between a position to provide forward rotation in which the ninth port AP$_9$ is in communication with the small diameter portion 185 and a position to provide backward rotation in which the tenth port AP$_{10}$ is in communication with the small diameter portion 185.

The scope of the invention includes the following modifications, individually or in combination, to the constructions and objects of the foregoing embodiments:

(1) Only a pair of the second and fourth change speed gear mechanisms 10 and 12 or a pair of the first and third change speed gear mechanisms 9 and 11 is provided to produce a four step speed changing.

(2) One or plural pairs of change speed mechanisms similar to the third and fourth change speed gear mechanisms 11 and 12 is or are mounted between the fifth intermediate transmission shaft 38 and one or both of the third and fourth change speed gear mechanisms 11 and 12 to produce twelve or more speeds. Then the speed control valve has control positions to control the valves similar to the first valve 90 and associated with the added change speed mechanisms as well as the other valves, in patterns as shown in Tables I and III.

(3) Hydraulic actuators for operating the forks connected to the change speed gear mechanisms have constructions well known in the art.

(4) The speed control valve comprises a rotary type valve.

Figure 16:
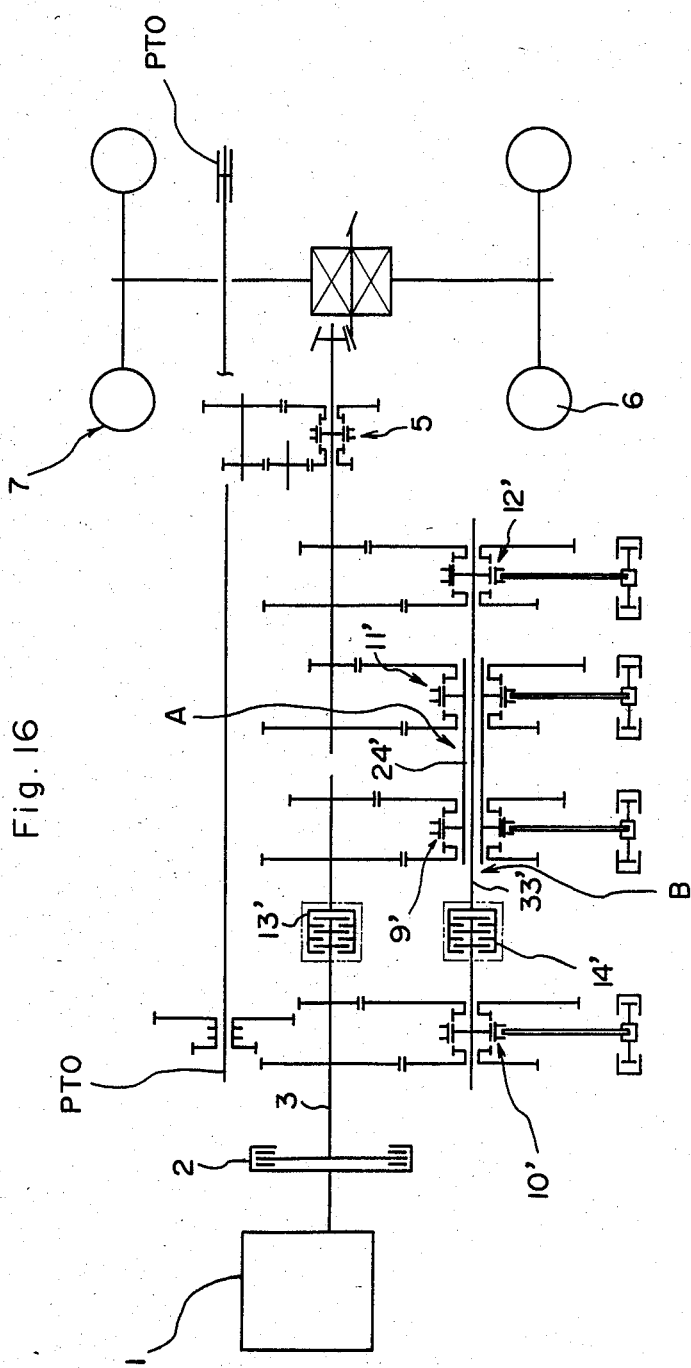
FIG. 16 is a drawing showing a power transmission system including a modified change speed gearing system.

Referring to FIG. 16 showing a modified embodiment, a first transmission shaft 24' comprises a sleeve shaft and a second shaft 33' is located therein. The first transmission shaft 24' has a first and a second synchromesh type change speed gear mechanisms 9' and 11'. An input shaft 3 has a first clutch 13' at a certain position. The second transmission shaft 33' has a third and a fourth synchromesh type change speed gear mechanisms 10' and 12' and a second clutch 14'. The timeing for speed changing operation in this embodiment is the same as in the foregoing embodiment and its description is therefore not repeated.

The feature of this embodiment lies in the double shaft construction of the first and second transmission shafts 24' and 33', which provides for compactness of construction by reducing the accommodating space in directions normal to the axial directions of the two shafts 24' and 33'.

I claim:

1. A speed changing apparatus for a working vehicle of the type having an engine and traveling means to permit said vehicle to travel over the surface of the ground, said apparatus comprising:

an input shaft operatively connected to the engine;

and output shaft coaxially aligned with said input shafts and operatively connected to the traveling means;

a fifth intermediate shaft provided between said input shaft and said output shaft;

a first intermediate shaft and a third intermediate shaft coaxially aligned with one another and together comprising first transmission line means to transmit power from said input shaft to said fifth intermediate shaft;

a second intermediate shaft and a fourth intermediate shaft coaxially aligned with one another and together comprising second transmission line means to transmit power from said input shaft to said fifth intermediate shaft;

a first synchromesh type change speed gear means for effecting speed changes between said input shaft and said first intermediate shaft;

a second synchromesh type change speed gear means for effecting speed changes between said input shaft and said second intermediate shaft;

a third synchromesh type change speed gear means for effecting speed changes between said third intermediate shaft and said fifth intermediate shaft;

a fourth synchromesh type change speed gear means for effecting speed changes between said fourth intermediate shaft and said fifth intermediate shaft;

first hydraulically operated frictional clutch means operatively disposed and coaxially aligned between said first intermediate shaft and said third intermediate shaft for directly interconnecting said first and third intermediate shafts for a direct drive therebetween; and second hydraulically operated frictional clutch means operatively disposed and coaxially aligned between said second intermediate shaft and said fourth intermediate shaft for directly interconnecting said second and fourth intermediate shafts for a direct drive therebetween.

2. A speed changing apparatus as defined in claim 1 further comprising a fifth synchromesh type change speed gear means provided between said fifth intermediate shaft and said output shaft to effect backward-forward drive switching.

3. A speed changing apparatus for a vehicle of the type having an engine and travel means over ground surfaces, said apparatus comprising:

an input shaft operatively connected to said engine;

an output shaft coaxially aligned with said input shaft and operatively connected to said travel means;

means establishing a first transmission line operatively interconnected between said input and output shafts for transmitting power from the engine through said input shaft and to said travel means via said output shaft, said first transmission line including first and third coaxially aligned intermediate shafts;

means establishing a second transmission line operatively interconnected between said input and output shafts for transmitting power from the engine through said input shaft and to said travel means via said output shaft, said second transmission line including second and fourth coaxially aligned intermediate shafts;

a fifth intermediate shaft operatively interconnecting said output shaft and said first and second transmission lines;

first synchromesh-type change speed gear means including first hydraulic control valve means for effecting speed changes between said input shaft and said first intermediate shaft;

second synchromesh-type change speed gear means including second hydraulic control valve means for effecting speed changes between said input shaft and said second intermediate shaft;

third synchromesh-type change speed gear means including third hydraulic control valve means for effecting speed changes between said third and fifth intermediate shafts;

fourth synchromesh-type change speed gear means for effecting speed changes between said fourth and fifth intermediate shafts;

first hydraulically operable clutch means disposed between said first and third intermediate shafts for operatively interconnecting and disconnecting said first and third intermediate shafts;

second hydraulically operable clutch means disposed between said second and fourth intermediate shafts for operatively interconnecting and disconnecting said second and fourth intermediate shafts; and hydraulic control means to permit selective operation of said first, second, third and fourth control valve means and said first and second clutch means.

* * * * *